US006935677B2

(12) United States Patent
Nania

(10) Patent No.: US 6,935,677 B2
(45) Date of Patent: Aug. 30, 2005

(54) BACKLITE RETENTION SYSTEM

(75) Inventor: Adrian Nania, Rochester, MI (US)

(73) Assignee: Edscha Roof Systems Inc., Pontiac, MI (US)

(*) Notice: Subject to any disclaimer, the term of this patent is extended or adjusted under 35 U.S.C. 154(b) by 0 days.

(21) Appl. No.: 10/459,306

(22) Filed: Jun. 11, 2003

(65) Prior Publication Data

US 2004/0251713 A1 Dec. 16, 2004

(51) Int. Cl.[7] .................................................. B60J 1/18
(52) U.S. Cl. ......................... 296/146.14; 296/107.07; 296/145
(58) Field of Search .................. 296/107.07, 146.14, 296/145, 201

(56) References Cited

U.S. PATENT DOCUMENTS

| | | | |
|---|---|---|---|
| 3,385,629 A | 5/1968 | Podolan | 296/146 |
| 5,271,655 A * | 12/1993 | Ball et al. | 296/146.14 |
| 5,375,901 A | 12/1994 | Agosta et al. | 296/146.14 |
| 5,460,424 A | 10/1995 | Wagner | 296/146.14 |
| 5,593,202 A | 1/1997 | Corder et al. | 296/108 |
| 5,829,820 A * | 11/1998 | Cowsert | 296/107.11 |
| 5,887,936 A | 3/1999 | Cowsert | 296/107.07 |
| 6,102,467 A | 8/2000 | Laurain et al. | 296/107.07 |
| 6,152,518 A | 11/2000 | Schoenenbach | 296/107.06 |
| 6,260,904 B1 | 7/2001 | Hartmann et al. | 296/107.01 |
| 6,263,627 B1 | 7/2001 | Schoenenbach et al. | 52/208 |
| 6,309,009 B1 | 10/2001 | Bloechl et al. | 296/107.06 |
| 6,341,810 B2 | 1/2002 | Hartmann et al. | 296/107.01 |
| 6,471,283 B2 * | 10/2002 | Windpassinger et al. | 296/146.14 |
| 2001/0035665 A1 | 11/2001 | Hartmann et al. | 296/107.01 |
| 2002/0047290 A1 | 4/2002 | Windpassinger et al. | 296/146.14 |

* cited by examiner

Primary Examiner—Patricia L. Engle
(74) Attorney, Agent, or Firm—Davidson, Davidson & Kappel, LLC

(57) ABSTRACT

A backlite retention system for a motor vehicle convertible roof includes a roof canopy defining an opening therein, an outer ring disposed along an edge of the opening and adjacent an outer side of the canopy, and a transparent backlite adhesively bonded to an outer surface of the outer ring. In addition, a method for attaching a backlite to a roof canopy of a convertible motor vehicle includes fastening an outer ring to the roof canopy adjacent an outer side of the canopy along an opening in the canopy, and adhesively bonding a backlite to an outer surface of the outer member.

25 Claims, 5 Drawing Sheets

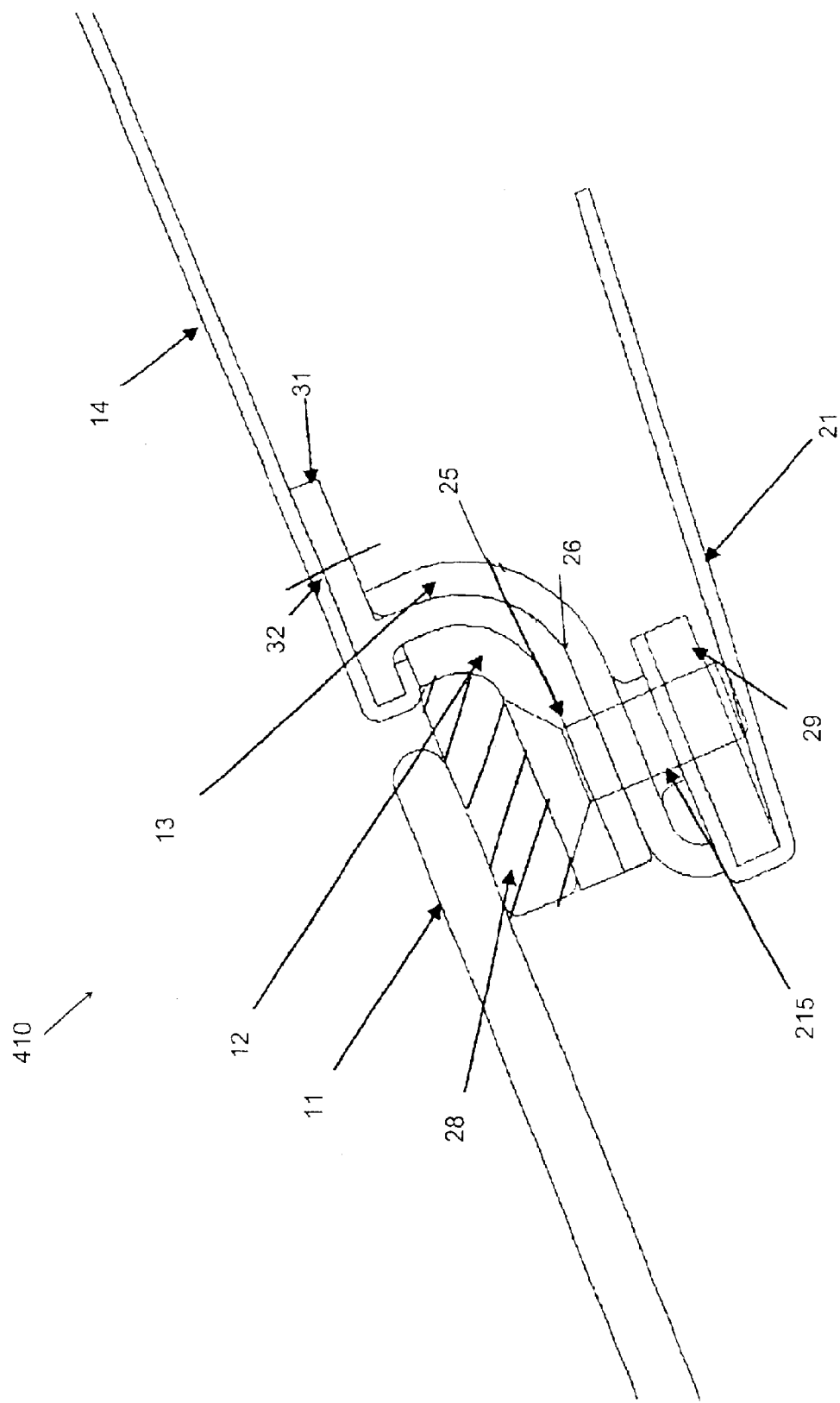

BACKLITE RETENTION SYSTEM

BACKGROUND OF THE INVENTION

The present invention relates generally to motor vehicles, and more particularly to a backlite retention system for motor vehicles having convertible tops.

Soft or hard convertible vehicle tops often have a rear section containing the rear window, referred to as the backlite. Backlites may be made of a flexible material, such as polyvinyl chloride, or may be made of a rigid material, such as glass.

There are several known systems for retaining windows in motor vehicles. For example, U.S. Pat. No. 6,263,627 describes various assemblies for mounting a glass window to a metallic window frame, such as a glass pane in a hatchback door or sun roof In addition, several systems are known for retaining a backlite in a convertible motor vehicle. For example, U.S. Pat. No. 6,102,467 describes a backlite retention system for retaining a backlite in a soft top convertible roof. In that system, an elongated carrier is disposed adjacent to an outside surface of a backlite. A portion of the roof cover is wrapped around the end of the carrier and adjacent the outside surface of the backlite and a portion of a seal. A plurality of retainers spaced around the periphery of the backlite compress the roof cover, backlite, and seal against the carrier. A disadvantage of this system is that repair of a broken backlite requires disassembly each of the plurality of the carriers from the retainer. Also, the carrier is external to the backlite and therefore visible from the exterior of the vehicle.

U.S. Pat. No. 5,460,424 describes a replaceable backlite for a convertible vehicle. The vinyl backlite includes a flexible channel member dielectrically bonded to a peripheral edge of the window. A retainer molding strip fits into the channel member and holds the edge of the soft roof cover in the channel member and covers the outside edge of the backlite and roof. This system is only practical for flexible backlites.

SUMMARY OF THE INVENTION

An object of the present invention is to provide a retention system for retaining a backlite in a convertible roof that allows for cost-effective assembly and repair.

An alternate or additional object of the present invention is to provide a backlite retention system useable for vehicles having a soft top roof canopy and a glass or other rigid backlite.

Yet another alternate or additional object of the present invention is to provide a backlite retention system that provides an attractive backlite/canopy interface without extensive visibility of supporting components.

The present invention provides a backlite retention system for a motor vehicle convertible roof that includes a roof canopy defining an opening therein, an outer ring disposed along an edge of the opening and adjacent an outer side of the canopy, and a transparent backlite adhesively bonded to an outer surface of the outer ring. As used herein "inner side" refers to a side facing toward the interior of the vehicle, and "outer side" and "outer surface" refers to the side or surface facing the exterior of the vehicle.

The system preferably also includes an inner ring disposed along the edge of the opening and adjacent an inner side of the canopy. Furthermore, the system preferably also includes a plurality of fastening devices preferably are also included connecting the inner ring and outer ring.

The inner ring preferably includes a support member with a headliner connected to the support member, preferably via a retainer member.

A first sealing layer may be disposed between the outer ring and the outer side of the canopy, and a second sealing layer may be disposed between the inner ring and the inner side of the canopy. The first and second sealing layers may include a sealant and/or a seal. An adhesive layer is preferably disposed between the outer ring and the transparent backlite for bonding the backlite to the outer ring.

The fastening devices may include rivets, for example self-piercing rivets or pop rivets and may include screws, such as self-forming countersunk screws. A headliner may be attached to the fastening devices.

The canopy may include a rigid edge part connected to a fabric of the canopy and the opening being defined within the rigid edge part.

The present invention also provides a backlite retention system for a motor vehicle convertible roof that includes a roof canopy defining an opening therein, a rigid edge member connected to the roof canopy at an edge of the opening, an outer ring disposed adjacent an outer side of the edge member, and a transparent backlite adhesively bonded to an outer side of the outer ring.

The rigid edge member is securely attached to the canopy and preferably stitched to the canopy. The system preferably also includes an inner ring disposed adjacent an inner side of the edge member, and a plurality of fastening devices connecting the inner ring to the outer ring.

In addition, the present invention provides a method for attaching a backlite to a roof canopy of a convertible motor vehicle. The method includes fastening an outer ring to the roof canopy adjacent an outer side of the canopy along an opening in the canopy, and adhesively bonding a backlite to an outer surface of the outer member. Preferably, the bonding is performed after the fastening.

The method preferably also includes disposing an inner ring adjacent an inner side of the canopy along the opening, and the fastening preferably includes fastening the outer ring to the canopy and to the inner ring using a plurality of fastening devices.

An adhesive layer may be applied to the outer surface of the outer ring before the bonding of the backlite. The inner ring may be adhesively bonded to the canopy before the fastening. Preferably, the method also includes attaching a headliner to a support member of the inner ring or to at least one of the plurality of fastening devices.

BRIEF DESCRIPTION OF THE DRAWINGS

The invention will be elaborated upon below based on exemplary embodiments with reference to the drawings, in which:

FIG. 5 shows a partial cross-sectional view of a fourth embodiment of a backlite retention system according to the present invention.

DETAILED DESCRIPTION

Figure 1:
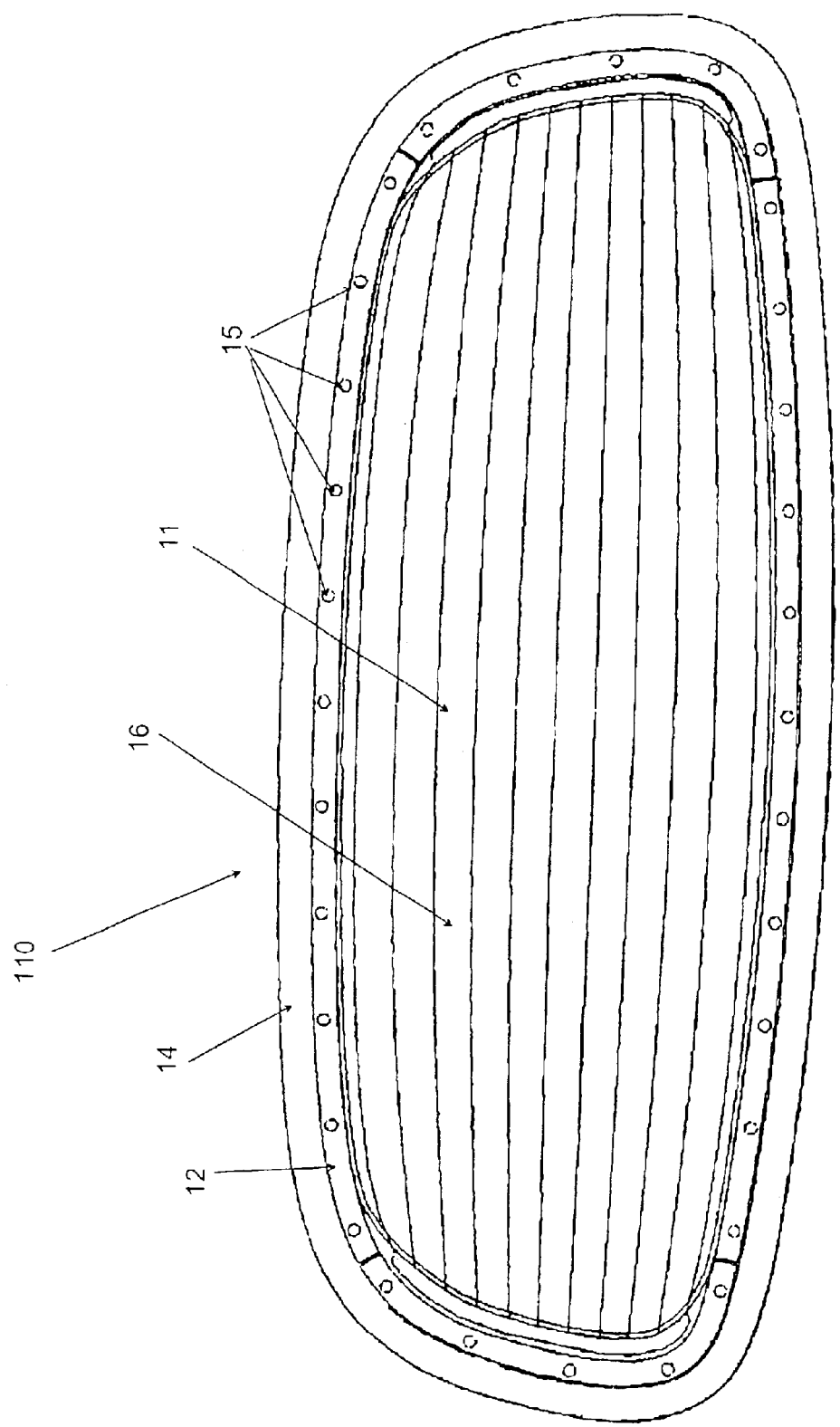
FIG. 1 shows a schematic a first embodiment of a backlite retention system for a motor vehicle convertible roof according to the present invention.
Figure 2:
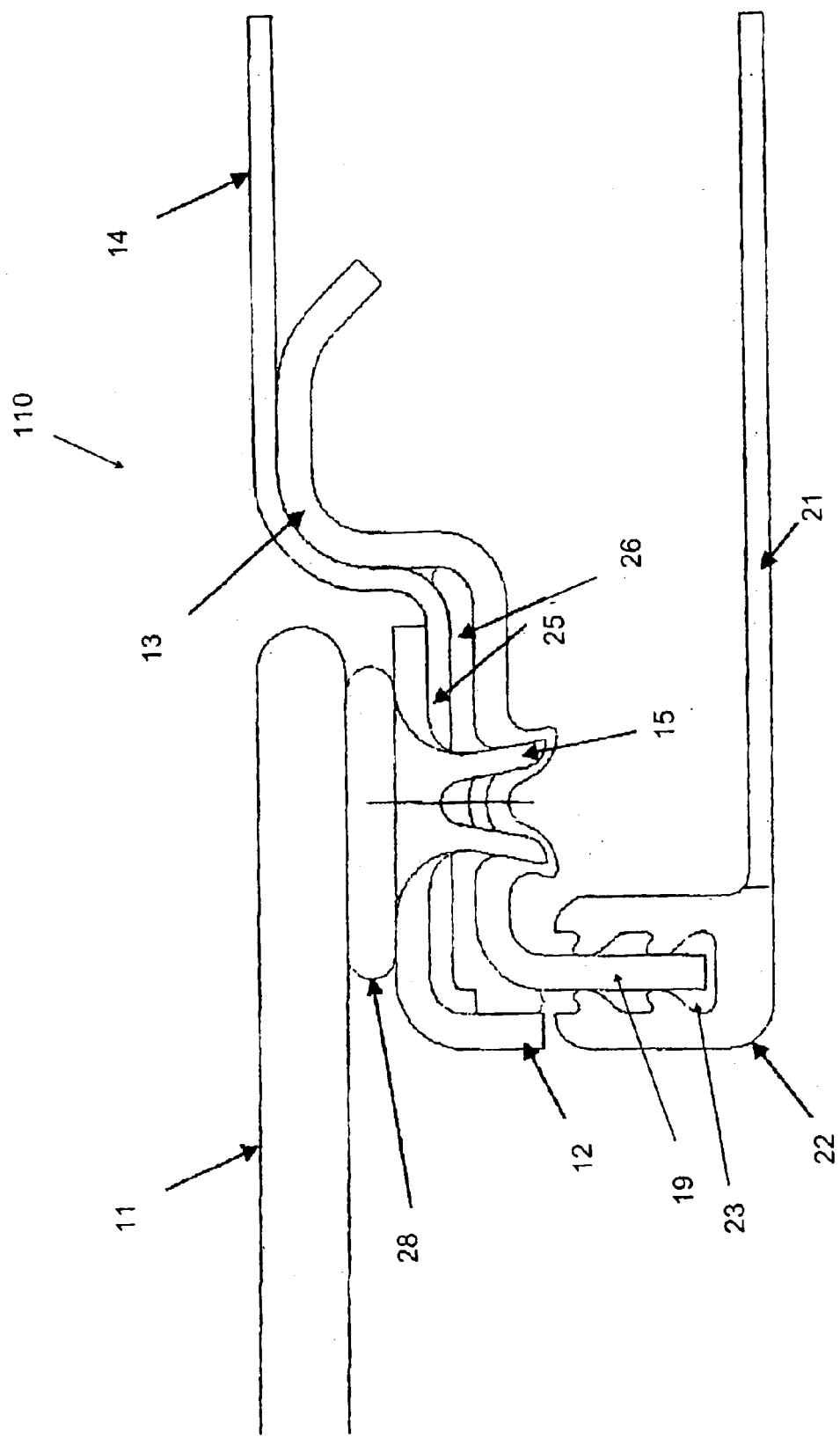
FIG. 2 shows a partial cross-sectional view of the retention system shown in FIG. 1.

A first embodiment 110 of a backlite retention system for a motor vehicle roof according to the present invention is shown in a view from the outside of the vehicle in FIG. 1. A cross-sectional view of the interface between a flexible roof canopy 14 of a soft top convertible vehicle and the backlite 11 is shown in FIG. 2. Canopy 14 defines a rear window opening 16, which is occupied by the backlite 11.

Inner ring 13, which may be made from stamped aluminum or steel, for example, and is preferably as a single piece, surrounds opening 16. Inner ring 13 is disposed along the edge of opening 16 adjacent an inner side of roof canopy 14. An adhesive layer, such as double-sided tape, may be disposed between the canopy 14 and inner member 13 to assist in assembly of the retention system 110 by preventing relative movement at the interface between the canopy 14 and inner ring 13 as additional components, such as the outer ring 12 and the fastening devices 15 are be added. Sealing layer 26, which may include a seal and/or a sealant, may be provided between canopy 14 and inner ring 13 to prevent leakage or seepage, but may not be necessary, particularly when the fastening device does not fully pierce through inner ring 13.

Outer ring 12 is disposed along the edge of opening 16 and adjacent an outer surface of canopy 14. Sealing layer 25, which may include a seal and/or a sealant, is preferably disposed between outer ring 12 and canopy 14 to prevent leakage and seepage. If sealing layer 25 is a sealant, it may also act as an adhesive between the outer ring 12 and canopy 14, which may be helpful during the assembly of the components. Fastening devices 15 securely connect outer ring 12 and inner ring 13 to one another, thus firmly holding canopy 14 in place. Fastening device 15 shown in FIG. 2 may be a self-piercing rivet, such as those sold under the trade name Henrob™ or Rivset™. The self-piercing rivets 15 do not pass all the way through inner ring 13, which may make it easier to provide a tight seal at the interface. In addition, self-piercing rivets do not require pre-formed holes in either the inner rig 13 or the outer ring 12. The glass backlite 11 is adhesively bonded to an outer surface of outer ring 12 using a bead of glass adhesive 28 that is applied to the outer surface of the outer ring 12, preferably along the entire periphery of opening 16. Inner ring 13 is preferably shaped to include a bent portion as shown in FIG. 2 so that the canopy 14 and backlite 11 occupy substantially the same plane. This construction provides for a smooth transition between the canopy and backlite, particularly as viewed from the vehicle exterior.

During assembly of the retention system, the inner ring, which is preferably a single piece of material having substantially the same size and shape as the opening 16, is first positioned along the periphery edge of opening 16 adjacent the inner surface of canopy 14. A sealing layer 26 (a seal or a sealant) is optionally disposed therebetween. An adhesive layer, such as double sided tape affixed to the outer surface of the inner ring, may be used, to help keep the inner ring 14 in place until the outer ring 12 and any sealing layers 25 and 26 are be added. Outer ring 12 may be a single piece, or, because the single-piece inner ring provides a rigid frame for opening 16, may also be made up of several pieces (such as the four pieces shown in FIG. 1). Outer ring 12 and sealing layer 25, preferably a sealant, are then disposed adjacent the outer surface of canopy 14. The inner ring and outer ring are preferably clamped together to prevent relative movement between the inner and outer rings, the canopy, and any sealing layers, while fastening devices 15 are added. After the fastening devices 15 are added, a secure and durable attachment between the inner ring has been achieved, and the clamps can be removed. In FIG. 1, outer ring 12 and fastening devices 15 are visible through the backlite 11, for illustration purposes only. Typically, the fastening devices would be covered by the adhesive layer 28 and a frit on the edge of the backlite and therefore would not be visible from the exterior of the vehicle. Once the fastening devices have been added and the clamps removed, a bead of glass adhesive 28, preferably urethane, can be added to the outer surface of outer ring 12, and backlite 11 can be pressed on so as to adhesively bond to the outer ring. The bonding of the backlite 11 to the outer ring 12 is a procedure similar to the procedure commonly used for mounting the front windshield to a vehicle. The assembly of the inner and outer rings 12 and 13 provide the necessary rigidity to the periphery of opening 16 to make this procedure possible. In addition, outer ring 12 is preferably e-coated so as to create a particularly secure bond between adhesive 28 and outer ring 12, in a similar manner as is found in front windshield assemblies.

A headliner is a strip of material that is used as an interior lining to the roof canopy 14 and functions, in part to cover the inner side of the canopy as well as any bows and roof mechanism components. Thus, at the interior side of the interface between the backlite 11 and the canopy 14, provision is preferably made for attachment of headliner 21. In the first embodiment, the headliner 21 is attached to a retainer member 22, which may include slot 23. Inner ring member includes a support member 19, such as a flange. The headliner 21 is thus fixed at the periphery of the backlite 11 in a simple manner by pushing the retainer 22 so that flange 19 is inserted into slot 23. The headliner 21 may also be easily removed when the backlite is being repaired or serviced so as to provide additional space and to avoid damage to the headliner. Although FIG. 2 illustrates a flange/slot arrangement, other modes for attaching the headliner to the inner ring are contemplated and considered within the scope of the invention.

Figure 3:
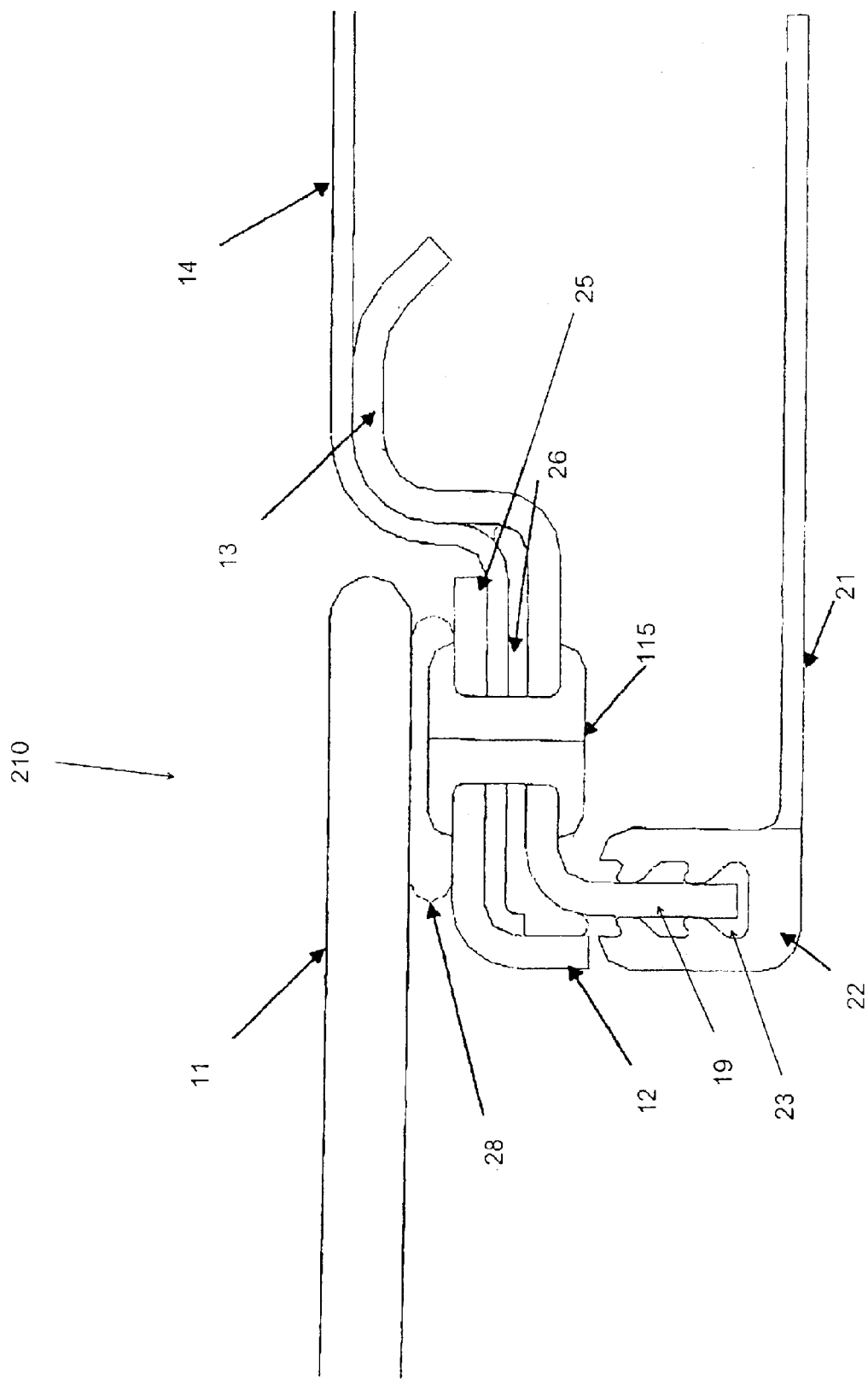
FIG. 3 shows a partial cross-sectional view of a second embodiment of a backlite retention system according to the present invention.

In a second embodiment 210 of the backlite retention system, illustrated in FIG. 3, the fastening device is a standard pop on rivet 115 that extends all the way through to the inner side of inner ring 13. Holes are preferably pre-formed in both inner ring 13 and outer ring 12 for accommodating the pop rivets 115.

Figure 4:
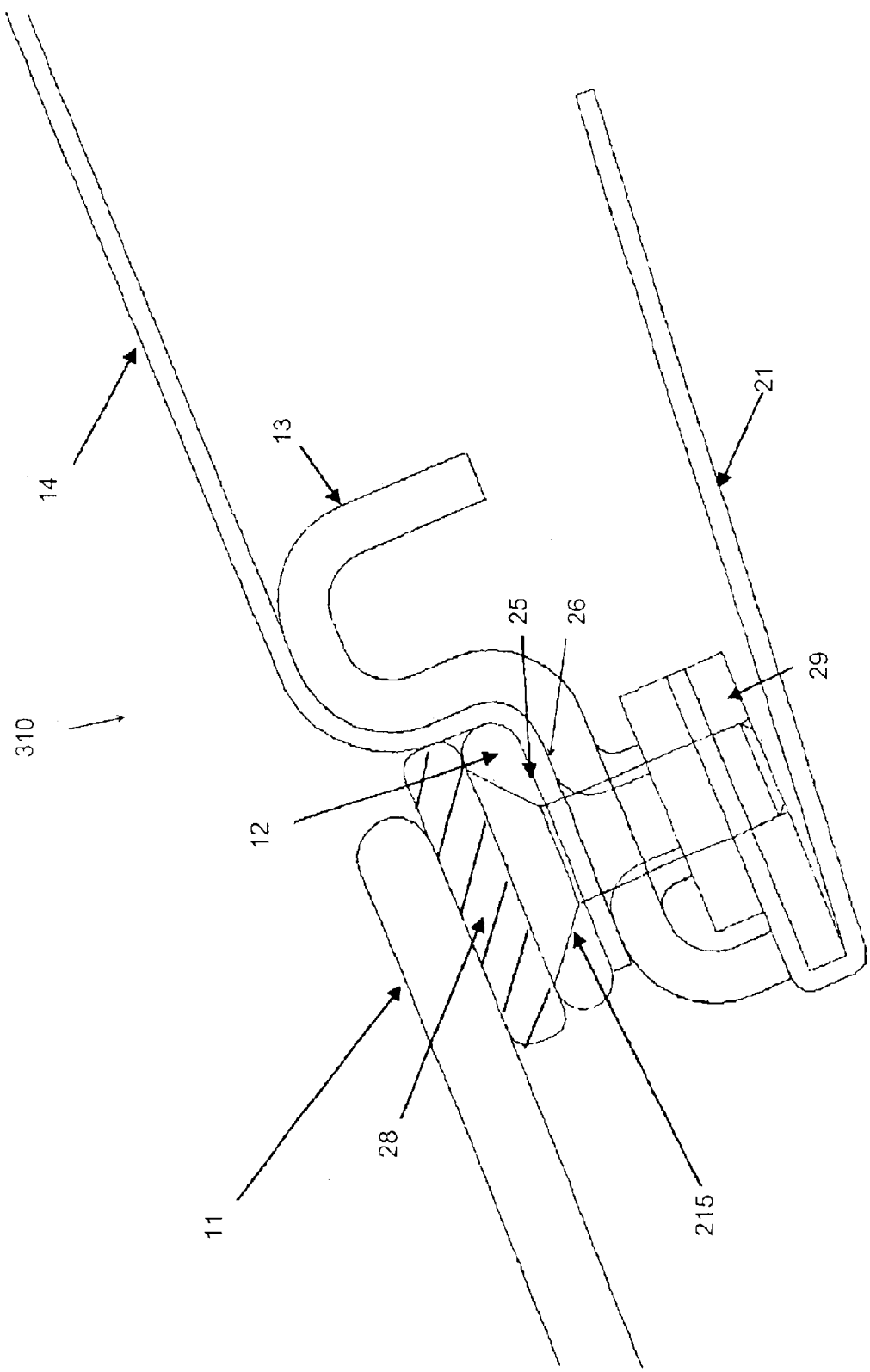
FIG. 4 shows a partial cross-sectional view of a third embodiment of a backlite retention system according to the present invention.

A third embodiment 310 of the backlite retention system, illustrated in FIG. 4, is similar to the first two embodiments except that countersunk screw 215 is used as the fastening device. Countersunk screw 215 is preferably self-forming and inner ring 13 preferably includes an extruded hole for receiving screw 215. Outer ring 12 includes a countersunk hole for receiving the screw head of screw 215 and for providing a flush outer surface of outer ring 12 when screw 215 is installed. In the third embodiment the headliner is retained using a push-on clip 29 fastened at the end of screw 215.

A fourth embodiment 410 of the backlite retention system, illustrated in FIG. 5, includes an edge member 31 securely connected to canopy 14 along the edge of opening 16. Edge member 31 is preferably stitched to canopy 14 at stitch 32 and may be alternatively or additionally attached to canopy 14 using an adhesive. Edge member 31 is sandwiched between inner and outer rings 13 and 12 and countersunk screw fastens the inner ring 13, outer ring 12 and edge member 31. Other fastening members, such as rivets or other types of screws may also be used in connection with the fourth embodiment 410. Headliner 21 may also be secured using a push-on clip 29 secured to the screw 215, as shown in FIG. 5, or using other modes of attachment as described above.

What is claimed is:

1. A backlite retention system for a motor vehicle convertible roof comprising:

a roof canopy defining an opening therein;

an inner ring disposed alone the edge of the opening and adjacent an inner side of the canopy;

an outer ring disposed along an edge of the opening and adjacent an outer side of the canopy; and a transparent backlite adhesively bonded to an outwardly facing outer surface of the outer ring.

2. The backlite retention system as recited in claim 1, further comprising a plurality of fastening devices connecting the inner ring and outer ring.

3. The backlite retention system as recited in claim 2, wherein the plurality of fastening devices include rivets.

4. The backlite retention system as recited in claim 3, wherein the rivets include at least one of a self-piercing rivet and a pop rivet.

5. The backlite retention system as recited in claim 2, wherein the plurality of fastening devices includes screws.

6. The backlite retention system as recited in claim 5 wherein the screws include a least one self-forming countersunk screw.

7. The backlite retention system as recited in claim 2, further comprising a headliner attached to the plurality of fastening devices.

8. The backlite retention system as recited in claim 1, wherein the inner ring includes a support member and further comprising a headliner connected to the support member.

9. The backlite retention system as recited in claim 1, further comprising a first sealing layer between the outer ring and the outer side of the canopy.

10. The backlite retention system as recited in claim 9, wherein the first sealing layer includes at least one of a seal and a sealant.

11. The backlite retention system as recited in claim 1, further comprising a second sealing layer between the inner ring and the inner side of the canopy.

12. The backlite retention system as recited in claim 11, wherein the second sealing layer includes at least one of a seal and a sealant.

13. The backlite retention system as recited in claim 1 wherein the canopy includes a rigid edge part connected to a fabric of the canopy, the opening being defined within the rigid edge part.

14. A backlite retention system for a motor vehicle convertible roof comprising:

a roof canopy defining an opening therein;

an outer ring disposed along an edge of the opening and adjacent an outer side of the canopy;

a transparent backlite adhesively bonded to an outwardly facing outer surface of the outer ring; and an adhesive layer between the outer ring and the transparent backlite.

15. The backlite retention system as recited in claim 14, further comprising an inner ring disposed along the edge of the opening and adjacent an inner side of the canopy.

16. A backlite retention system for a motor vehicle convertible roof comprising:

a roof canopy defining an opening therein;

a rigid edge member connected to the roof canopy at an edge of the opening;

an inner ring disposed adjacent an inner side of the edge member;

an outer ring disposed adjacent an outer side of the edge member; and a transparent backlite adhesively bonded to an outwardly facing outer side of the outer ring.

17. The backlite retention system as recited in claim 16, wherein the rigid edge member is stitched to the canopy.

18. The backlite retention system as recited in claim 16, further comprising a plurality of fastening devices connecting the inner ring to the outer ring.

19. A method for attaching a backlite to a roof canopy of a convertible motor vehicle, the method comprising:

fastening an outer ring to the roof canopy adjacent an outer side of the canopy along an opening in the canopy; and subsequently adhesively bonding a backlite to an outwardly facing outer surface of the outer member.

20. The method as recited in claim 19, further comprising disposing an inner ring adjacent an inner side of the canopy along the opening.

21. The method as recited in claim 20, wherein the fastening includes fastening the outer ring to the canopy and to the inner ring using a plurality of fastening devices.

22. The method as recited in claim 21, further comprising adhesively bonding the inner ring to the canopy before the fastening.

23. The method as recited in claim 21, further comprising attaching a headliner to at least one of the plurality of fastening devices.

24. The method as recited in claim 20, further comprising attaching a headliner to a support member of the inner ring.

25. The method as recited in claim 19, further comprising applying an adhesive layer to the outer surface of the outer ring before the bonding of the backlite.

* * * * *